(12) United States Patent
Doi et al.

(10) Patent No.: US 12,270,456 B2
(45) Date of Patent: Apr. 8, 2025

(54) RAW EDGE V-BELT

(71) Applicant: BANDO CHEMICAL INDUSTRIES, LTD., Kobe (JP)

(72) Inventors: Ikuhito Doi, Kobe (JP); Shogo Kobayashi, Kobe (JP); Noriaki Naoda, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 749 days.

(21) Appl. No.: 17/543,499

(22) Filed: Dec. 6, 2021

(65) Prior Publication Data

US 2022/0090647 A1 Mar. 24, 2022

Related U.S. Application Data

(63) Continuation of application No. PCT/JP2020/018371, filed on May 1, 2020.

(30) Foreign Application Priority Data

Jun. 7, 2019 (JP) .................................. 2019-107200

(51) Int. Cl.
| | |
|---|---|
| F16G 5/04 | (2006.01) |
| C08L 15/02 | (2006.01) |
| F16G 5/08 | (2006.01) |
| F16G 5/20 | (2006.01) |

(52) U.S. Cl.
CPC ................ F16G 5/04 (2013.01); C08L 15/02 (2013.01); *C08L 2205/03* (2013.01); *C08L 2205/06* (2013.01); *C08L 2205/16* (2013.01); *F16G 5/08* (2013.01); *F16G 5/20* (2013.01)

(58) Field of Classification Search
CPC ..... F16G 5/04; F16G 5/08; F16G 5/20; C08L 15/02; C08L 2205/03; C08L 2205/06; C08L 2205/16
USPC .......................................................... 524/35
See application file for complete search history.

(56) References Cited

U.S. PATENT DOCUMENTS

| | | | |
|---|---|---|---|
| 2006/0217491 | A1 | 9/2006 | Higashira et al. |
| 2016/0208890 | A1 | 7/2016 | Nonaka et al. |
| 2019/0219134 | A1 | 7/2019 | Kunihiro et al. |
| 2020/0123350 | A1 | 4/2020 | Kobayashi et al. |
| 2020/0124135 | A1 * | 4/2020 | Tsuchiya ................... C08L 1/02 |

FOREIGN PATENT DOCUMENTS

| | | | | |
|---|---|---|---|---|
| CN | 1777643 | A | 5/2006 | |
| JP | 2018-35940 | A | 3/2018 | |
| JP | 6427302 | B | 11/2018 | |
| TW | 201906913 | A | 2/2019 | |
| WO | 2015045255 | A1 | 2/2015 | |
| WO | WO-2018056055 | A1 * | 3/2018 | ............... C08K 3/04 |
| WO | 2018/235421 | A1 | 12/2018 | |

* cited by examiner

*Primary Examiner* — Ling Siu Cho
*Assistant Examiner* — Ronald Grinsted
(74) *Attorney, Agent, or Firm* — Maschoff Brennan

(57) ABSTRACT

A raw edge V-belt includes: a compression rubber layer formed on an inner side of the belt and made of a rubber composition. The rubber composition contains a rubber component, fine cellulose fibers, and short fibers. The content of the short fibers in the rubber composition is 25 parts by mass or more and 45 parts by mass or less per 100 parts by mass of the rubber component, and the volume fraction of the short fibers in the rubber composition is 12.5 vol % or more.

14 Claims, 3 Drawing Sheets

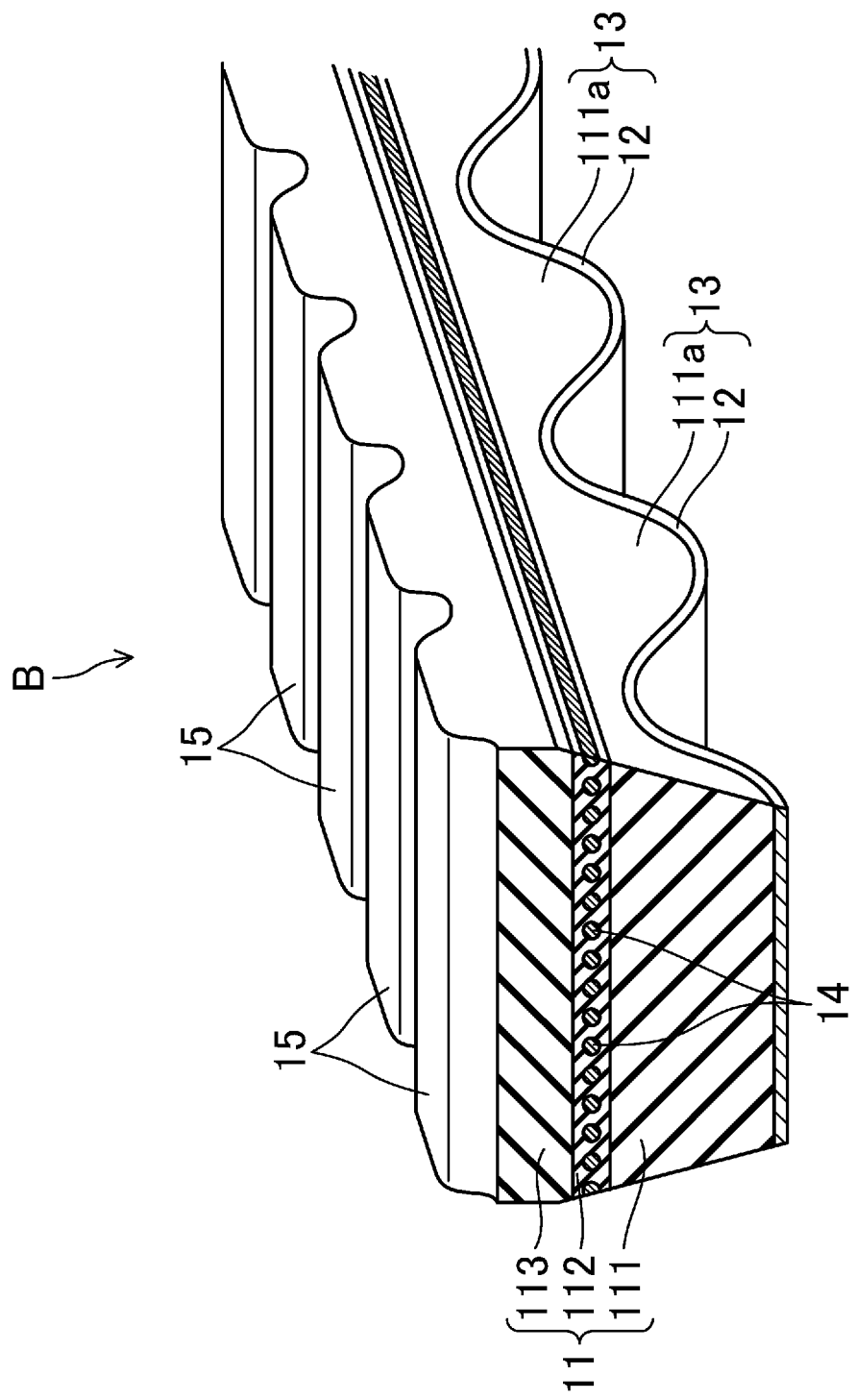

RAW EDGE V-BELT

CROSS-REFERENCE TO RELATED APPLICATIONS

This is a continuation of International Application No. PCT/JP2020/018371 filed on May 1, 2020, which claims priority to Japanese Patent Application No. 2019-107200 filed on Jun. 7, 2019. The entire disclosures of these applications are incorporated by reference herein.

BACKGROUND

The present invention relates to raw edge V-belts.

It is known in the art to use a rubber composition containing both fine cellulose fibers and short fibers for transmission belts (e.g., Japanese Patent No. 6427302).

SUMMARY

The present invention is a raw edge V-belt including: a compression rubber layer formed on an inner side of the belt and made of a rubber composition. The rubber composition contains a rubber component, fine cellulose fibers, and short fibers. A content of the short fibers in the rubber composition is 25 parts by mass or more and 45 parts by mass or less per 100 parts by mass of the rubber component, and a volume fraction of the short fibers in the rubber composition is 12.5 vol % or more.

BRIEF DESCRIPTION OF THE DRAWINGS

FIG. 1A is a perspective view of a piece of a double cogged V-belt according to an embodiment.

DETAILED DESCRIPTION

An embodiment will be described in detail.

Figure 1B:
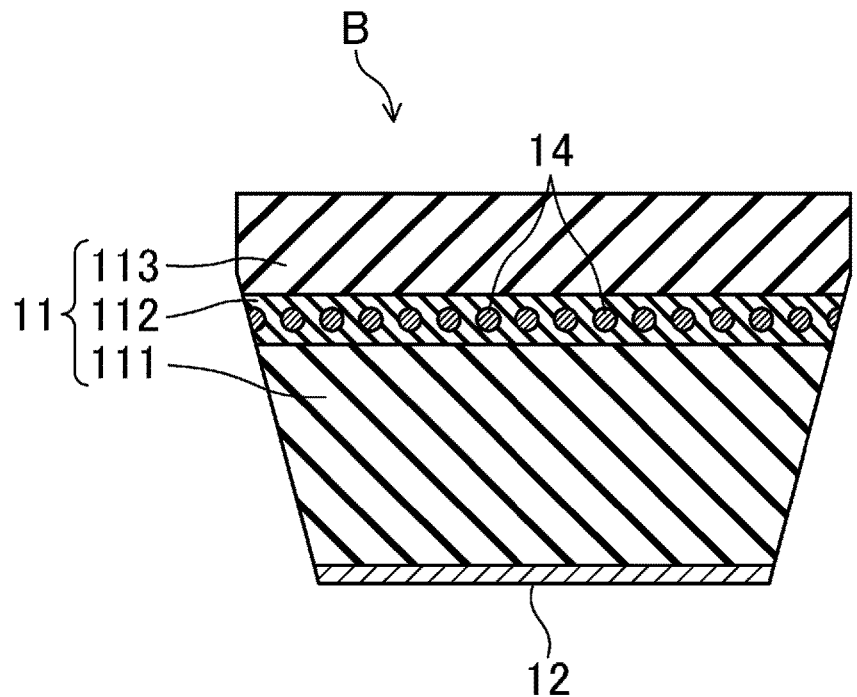
FIG. 1B is a sectional view of the double cogged V-belt according to the embodiment taken along a belt width direction.
Figure 1C:
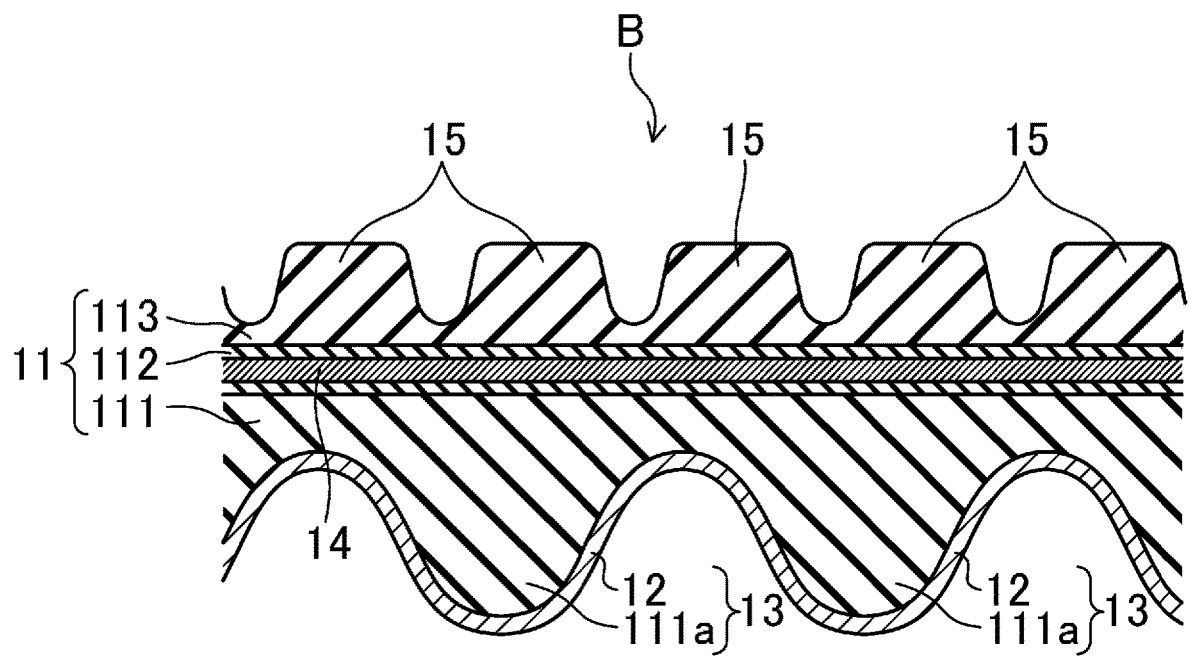
FIG. 1C is a sectional view of the double cogged V-belt according to the embodiment taken along a belt length direction.

FIGS. 1A to 1C illustrate a double cogged V-belt B (raw edge V-belt) according to the embodiment. For example, the double cogged V-belt B according to the embodiment is a power transmission member that is used as a transmission belt in a transmission device for two-wheeled vehicles. For example, the double cogged V-belt B according to the embodiment has a length of 700 mm or more and 1400 mm or less, a maximum width of 16 mm or more and 40 mm or less, and a maximum thickness of 8.0 mm or more and 18.0 mm or less.

The double cogged V-belt B according to the embodiment includes an endless rubber belt body 11. The belt body 11 is formed so that its sectional shape along the belt width direction is a combination of an isosceles trapezoid located on the inner side of the belt and a horizontally elongated rectangle located on the outer side of the belt. Tilted surfaces on both sides of the belt body 11 form a pulley contact portion. The belt body 11 is composed of three layers: a compression rubber layer 111 formed on the inner side of the belt, an adhesive rubber layer 112 that is an intermediate portion in the belt thickness direction, and a stretch rubber layer 113 formed on the outer side of the belt. The pulley contact portion formed by the tilted surfaces on both sides of the belt body 11 is composed of both side surfaces of the compression rubber layer 111 and the adhesive rubber layer 112 and an inner part of both side surfaces of the stretch rubber layer 113.

The double cogged V-belt B according to the embodiment further includes a covering cloth 12. The covering cloth 12 covers the inner surface of the compression rubber layer 111. The compression rubber layer 111 has lower cog forming portions 111a on its inner side. The lower cog forming portions 111a are formed at a fixed pitch and have a sinusoidal section when taken along the belt length direction. The lower cog forming portions 111a are covered with the covering cloth 12. The lower cog forming portions 111a and the covering cloth 12 covering the lower cog forming portions 111a form lower cogs 13. The double cogged V-belt B according to the embodiment includes a cord 14 embedded in an intermediate portion in the belt thickness direction of the adhesive rubber layer 112. The cord 14 is placed so as to extend in the circumferential direction and to form a helix with a pitch in the belt width direction. The stretch rubber layer 113 has upper cogs 15 on its upper side. The upper cogs 15 are formed at a fixed pitch and have a rectangular section when taken along the belt length direction.

The compression rubber layer 111 is made of a rubber composition A. The rubber composition A contains a rubber component, fine cellulose fibers, and short fibers. The rubber composition A is produced by kneading a mixture of the rubber component, the fine cellulose fibers, the short fibers, and various rubber compounding agents to produce an uncrosslinked rubber composition and crosslinking the uncrosslinked rubber composition by heating and pressing. As described later, in order to obtain excellent high load durability, it is suitable that the grain and cross-grain directions of the rubber composition A correspond to the belt width direction and the belt length direction, respectively, so that the short fibers are aligned in the belt width direction.

Examples of the rubber component of the rubber composition A include: chloroprene rubber (CR); ethylene-α-olefin elastomers such as ethylene-propylene copolymer (EPR), ethylene-propylene-diene terpolymer (EPDM), ethylene-octene copolymer, and ethylene-butene copolymer; chlorosulfonated polyethylene rubber (CSM); and hydrogenated acrylonitrile rubber (H-NBR). The rubber component is suitably one of these rubbers or a mixture of two or more thereof. In order to obtain excellent high load durability, the rubber component more suitably includes chloroprene rubber (CR), and even more suitably includes sulfur-modified chloroprene rubber (sulfur-modified CR).

The rubber composition A contains the fine cellulose fibers dispersed in the rubber component. The fine cellulose fibers are a fiber material that is derived from cellulose fibers composed of a skeletal component of plant cell walls obtained by finely loosening plant fibers. Examples of a raw material plant for the fine cellulose fibers include trees, bamboos, rice plants (rice straw), potatoes, sugarcane (bagasse), aquatic plants, and seaweeds. Of these plants, trees are suitable.

Examples of the fine cellulose fibers include untreated fine cellulose fibers and hydrophobized fine cellulose fibers obtained by hydrophobizing untreated fine cellulose fibers. The fine cellulose fibers suitably include either or both of the untreated fine cellulose fibers and the hydrophobized fine cellulose fibers.

Examples of the fine cellulose fibers include fine cellulose fibers with a high aspect ratio produced by a mechanical fibrillation process and needle-like crystals produced by a chemical fibrillation process. The fine cellulose fibers suitably include either or both of the fine cellulose fibers produced by the mechanical fibrillation process and the needle-like crystals produced by the chemical fibrillation process. In order to obtain excellent high load durability, the fine cellulose fibers more suitably include the fine cellulose fibers produced by the mechanical fibrillation process.

The average diameter of the fine cellulose fibers is, e.g., 10 nm or more and 1000 nm or less. The average length of the fine cellulose fibers is, e.g., 0.1 μm or more and 1000 μm or less. In order to obtain excellent high load durability, the content of the fine cellulose fibers in the rubber composition A is suitably 1 part by mass or more and 20 parts by mass or less, more suitably 1.5 parts by mass or more and 10 parts by mass or less, and even more suitably 2 parts by mass or more and 5 parts by mass or less, per 100 parts by mass of the rubber component.

The rubber composition A contains the short fibers dispersed in the rubber component. In order to obtain excellent high load durability, the short fibers are suitably aligned in the belt width direction. It is suitable that the short fibers have been subjected to an adhesion treatment such as RFL treatment for providing adhesion to the compression rubber layer 111 of the belt body 11.

Examples of the short fibers include para-aramid short fibers (polyparaphenylene terephthalamide short fibers, copolyparaphenylene-3,4'-oxydiphenylene terephthalamide short fibers), meta-aramid short fibers, nylon 66 short fibers, polyester short fibers, ultra-high molecular weight polyolefin short fibers, polyparaphenylene benzobisoxazole short fibers, polyarylate short fibers, cotton, glass short fibers, and carbon short fibers. The short fibers suitably include one or more of these. In order to obtain excellent high load durability, the short fibers suitably include para-aramid short fibers, and more suitably include copolyparaphenylene-3,4'-oxydiphenylene terephthalamide short fibers.

In order to obtain excellent high load durability, the length of the short fibers is suitably 1 mm or more and 5 mm or less and more suitably 2 mm or more and 4 mm or less, and the diameter of the short fibers is suitably 5 μm or more and 30 μm or less and more suitably 10 μm or more and 15 μm or less.

The content of the short fibers in the rubber composition A is 25 parts by mass or more and 45 parts by mass or less per 100 parts by mass of the rubber component. In order to obtain excellent high load durability, the content of the short fibers in the rubber composition A is suitably 27 parts by mass or more and 43 parts by mass or less, more suitably 30 parts by mass or more and 40 parts by mass or less, and even more suitably 32 parts by mass or more and 38 parts by mass or less, per 100 parts by mass of the rubber component. In order to obtain excellent high load durability, the content of the short fibers in the rubber composition A is suitably higher than that of the fine cellulose fibers in the rubber composition A. In order to obtain excellent high load durability, the ratio of the content of the short fibers to the content of the fine cellulose fibers (the content of the short fibers/the content of the fine cellulose fibers) in the rubber composition A is suitably 7.0 or more and 16.0 or less, and more suitably 9.0 or more and 13.0 or less.

The volume fraction of the short fibers in the rubber composition A is 12.5 vol % or more. In order to obtain excellent high load durability, the volume fraction of the short fibers in the rubber composition A is suitably 12.5 vol % or more and 25.0 vol % or less, more suitably 13.5 vol % or more and 21.0 vol % or less, and even more suitably 17.0 vol % and 20.0 vol % or less. This volume fraction is a value obtained by dividing the number of parts by mass of the short fibers divided by their specific gravity by the total number of parts by mass of the rubber composition A divided by its specific gravity and multiplying the resultant quotient by 100.

The rubber composition A may contain carbon black dispersed in the rubber component. Examples of the carbon black include: channel black; furnace black such as SAF, ISAF, N-339, HAF, N-351, MAF, FEF, SRF, GPF, ECF, and N-234; thermal black such as FT and MT; and acetylene black. The carbon black suitably includes one or more of these. In order to obtain excellent high load durability, the carbon black more suitably includes carbon black having an arithmetic mean particle size of 50 μm or less, and even more suitably includes FEF.

In order to obtain excellent high load durability, the content of the carbon black in the rubber composition A is suitably 30 parts by mass or more and 80 parts by mass or less, and more suitably 50 parts by mass or more and 60 parts by mass or less, per 100 parts by mass of the rubber component.

In the case where the rubber composition A contains carbon black, the content of the carbon black in the rubber composition A is suitably higher than that of the fine cellulose fibers in the rubber composition A in order to obtain excellent high load durability. In order to obtain excellent high load durability, the ratio of the content of the carbon black to the content of the fine cellulose fibers (the content of the carbon black/the content of the fine cellulose fibers) in the rubber composition A is suitably 5.0 or more and 19.0 or less, and more suitably 10.0 or more and 16.0 or less.

In the case where the rubber composition A contains carbon black, the content of the carbon black in the rubber composition A may be higher than, lower than, or the same as that of the short fibers in the rubber composition A. However, in order to obtain excellent high load durability, the content of the carbon black in the rubber composition A is suitably the same as or higher than that of the short fibers in the rubber composition A. The ratio of the content of the carbon black to the content of the short fibers (the content of the carbon black/the content of the short fibers) in the rubber composition A is suitably 0.30 or more and 2.8 or less, and more suitably 0.80 or more and 1.9 or less. In order to obtain excellent high load durability, the sum of the content of the carbon black and the content of the short fibers in the rubber composition A is suitably 64 parts by mass or more and 77 parts by mass or less, and more suitably 69 parts by mass or more and 74 parts by mass or less, per 100 parts by mass of the rubber component.

The rubber composition A may contain, as other rubber compounding agents, a plasticizer, a processing aid, an anti-aging agent, a crosslinker, a co-crosslinker, a vulcanization accelerator, a vulcanization acceleration auxiliary, etc.

Like the compression rubber layer 111, the adhesive rubber layer 112 and the stretch rubber layer 113 are also made of a rubber composition produced by kneading a mixture of a rubber component and various rubber compounding agents to produce an uncrosslinked rubber composition and crosslinking the uncrosslinked rubber composition by heating and pressing. The rubber composition forming the adhesive rubber layer 112 and/or the stretch rubber layer 113 may be the same as the rubber composition A forming the compression rubber layer 111.

The covering cloth 12 is made of, e.g., woven fabric, knitted fabric, or nonwoven fabric composed of yarn of cotton, polyamide fibers, polyester fibers, aramid fibers, etc. It is suitable that the covering cloth 12 has been subjected to an adhesion treatment such as RFL treatment for providing adhesion to the compression rubber layer 111 of the belt body 11.

The cord 14 is made of twisted yarn of polyester fibers, polyethylene naphthalate fibers, aramid fibers, vinylon fibers, etc. It is suitable that the cord 14 has been subjected to an adhesion treatment such as RFL treatment for providing adhesion to the adhesive rubber layer 112 of the belt body 11.

The double cogged V-belt B of the embodiment having the above configuration has excellent high load durability as the rubber composition A of the compression rubber layer 111 whose both side surfaces form a main part of the pulley contact portion contain the fine cellulose fibers and the short fibers, the content of the short fibers in the rubber composition A is 25 parts by mass or more and 45 parts by mass or less per 100 parts by mass of the rubber component, and the volume fraction of the short fibers in the rubber composition A is 12.5 vol % or more. The reason for this seems to be as follows. Since the compression rubber layer 111 is made of the rubber composition A, the pulley contact portion has a low coefficient of friction. Accordingly, during running under high load, the double cogged V-belt B is subjected to low frictional resistance when leaving pulleys. Energy loss is therefore small, resulting in reduced heat generation. Such an advantageous effect is particularly significant in applications where high torque and high load are applied to the belt, such as a transmission device for large two-wheeled vehicles in which the minimum winding diameter of a belt around a pulley is 70 mm or more.

The double cogged V-belt B according to the embodiment can be manufactured by a known method that is commonly used in the art.

The above embodiment illustrates the double cogged V-belt B, as a non-limiting raw edge V-belt example. The raw edge V-belt may be a single cogged V-belt having lower cogs only on its inner side or a raw edge V-belt having no cogs.

The above embodiment illustrates the double cogged V-belt B including the covering cloth 12 that covers the inner surface of the belt, as a non-limiting example. The double cogged V-belt B may include a covering cloth that covers the outer surface of the belt in addition to, or instead of, the covering cloth 12 that covers the inner surface of the belt. The double cogged V-belt B may not have the covering cloths that cover the inner and outer surfaces of the belt.

EXAMPLES (Double Cogged V-Belt)

Double cogged V-belts of Examples 1 to 5 and Comparative Examples 1 and 2 were produced. Components of rubber compositions forming compression rubber layers of Examples 1 to 5 and Comparative Examples 1 and 2 are also shown in Table 1.

Example 1

1 mass % of kraft pulp was added to water, and the mixture was premixed in a stirrer. The mixture thus stirred was then placed into an atomizing device (Star Burst, made by Sugino Machine Limited) and pressurized to 150 MPa to collide with a ceramic ball. This process in the atomizing device was repeated eight times to prepare an aqueous dispersion of fine cellulose fibers produced by a mechanical fibrillation process.

The aqueous dispersion of the fine cellulose fibers was mixed with sulfur-modified CR latex so that the content of the fine cellulose fibers was 3 parts by mass per 100 parts by mass of sulfur-modified CR that is a rubber component of the sulfur-modified CR latex. The mixture was solidified by air drying.

The solid CR-fine cellulose fiber composite thus obtained was placed into a rubber kneader and kneaded. 50 parts by mass of carbon black (FEF, arithmetic mean particle size: 43 μm), 5 parts by mass of a plasticizer (DOS), 1 part by mass of a processing aid (stearic acid), 2.3 parts by mass of an anti-aging agent, 5 parts by mass of a co-crosslinker (bismaleimide), and 5 parts by mass of magnesium oxide were added to the kneaded CR-fine cellulose fiber composite per 100 parts by mass of the sulfur-modified CR that is a rubber component, and the resultant mixture was kneaded. Thereafter, 5 parts by mass of zinc oxide and 25 parts by mass of RFL-treated para-aramid short fibers (copolyparaphenylene-3,4'-oxydiphenylene terephthalamide short fibers, fiber length of 3 mm and fiber diameter of 12 μm) were added to the kneaded mixture, and the resultant mixture was kneaded. An uncrosslinked rubber composition was thus prepared.

This uncrosslinked rubber composition was placed and crosslinked so that its grain direction corresponded to the belt width direction and its cross-grain direction corresponded to the belt length direction. The resultant rubber composition was used to form a compression rubber layer of a double cogged V-belt. A double cogged V-belt having a configuration similar to that of the above embodiment was thus produced as Example 1.

An adhesive rubber layer and a stretch rubber layer were made of a rubber composition containing sulfur-modified CR as a rubber component. A covering cloth was made of woven fabric of polyester fibers treated with RFL and rubber cement. A cord was made of twisted yarn of para-aramid fibers treated with RFL and rubber cement. Regarding the belt size, the belt length was 1200 mm, the maximum belt width was 33 mm, and the maximum belt thickness was 16.0 mm.

Example 2

As Example 2, a double cogged V-belt was produced with the same configuration as that of Example 1 except that the content of the carbon black and the content of the para-aramid short fibers in the rubber composition forming the compression rubber layer were 43 parts by mass and 30 parts by mass, respectively, per 100 parts by mass of the sulfur-modified CR that is a rubber component.

Example 3

As Example 3, a double cogged V-belt was produced with the same configuration as that of Example 1 except that both the content of the carbon black and the content of the para-aramid short fibers in the rubber composition forming the compression rubber layer were 35 parts by mass per 100 parts by mass of the sulfur-modified CR that is a rubber component.

Example 4

As Example 4, a double cogged V-belt was produced with the same configuration as that of Example 1 except that the content of the carbon black and the content of the para-aramid short fibers in the rubber composition forming the compression rubber layer were 28 parts by mass and 40 parts by mass, respectively, per 100 parts by mass of the sulfur-modified CR that is a rubber component.

Example 5

As Example 5, a double cogged V-belt was produced with the same configuration as that of Example 1 except that the content of the carbon black and the content of the para-aramid short fibers in the rubber composition forming the compression rubber layer were 20 parts by mass and 45 parts by mass, respectively, per 100 parts by mass of the sulfur-modified CR that is a rubber component.

Comparative Example 1

As Comparative Example 1, a double cogged V-belt was produced with the same configuration as that of Example 1 except that the content of the carbon black and the content of the para-aramid short fibers in the rubber composition forming the compression rubber layer were 58 parts by mass and 20 parts by mass, respectively, per 100 parts by mass of the sulfur-modified CR that is a rubber component.

Comparative Example 2

As Comparative Example 2, a double cogged V-belt was produced with the same configuration as that of Example 1 except that the content of the carbon black and the content of the para-aramid short fibers in the rubber composition forming the compression rubber layer were 13 parts by mass and 50 parts by mass, respectively, per 100 parts by mass of the sulfur-modified CR that is a rubber component.

TABLE 1

| | | Examples | | | | | Comparative Examples | |
|---|---|---|---|---|---|---|---|---|
| | | 1 | 2 | 3 | 4 | 5 | 1 | 2 |
| Rubber Compounding Agents, Parts by Mass | Rubber Component (Sulfur-Modified CR) | 100 | 100 | 100 | 100 | 100 | 100 | 100 |
| | Fine Cellulose Fibers X | 3 | 3 | 3 | 3 | 3 | 3 | 3 |
| | Para-Aramid Short Fibers Y | 25 | 30 | 35 | 40 | 45 | 20 | 50 |
| | Carbon Black (FEF) Z | 50 | 43 | 35 | 28 | 20 | 58 | 13 |
| | Plasticizer (DOS) | 5 | 5 | 5 | 5 | 5 | 5 | 5 |
| | Processing Aid (Stearic Acid) | 1 | 1 | 1 | 1 | 1 | 1 | 1 |
| | Anti-Aging Agent | 2.3 | 2.3 | 2.3 | 2.3 | 2.3 | 2.3 | 2.3 |
| | Co-Crosslinker (Bismaleimide) | 5 | 5 | 5 | 5 | 5 | 5 | 5 |
| | Magnesium Oxide | 5 | 5 | 5 | 5 | 5 | 5 | 5 |
| | Zinc Oxide | 5 | 5 | 5 | 5 | 5 | 5 | 5 |
| Volume Fraction of Short Fibers, vol % | | 12.6 | 15.1 | 17.7 | 20.3 | 22.9 | 10.0 | 25.5 |
| Y/X | | 8.3 | 10.0 | 11.7 | 13.3 | 15.0 | 6.7 | 16.7 |
| Z/X | | 16.7 | 14.3 | 11.7 | 9.3 | 6.7 | 19.3 | 4.3 |
| Z/Y | | 2.0 | 1.4 | 1.0 | 0.70 | 0.44 | 2.9 | 0.26 |
| Y + Z | | 75 | 73 | 70 | 68 | 65 | 78 | 63 |

(Test Method)

Figure 2:
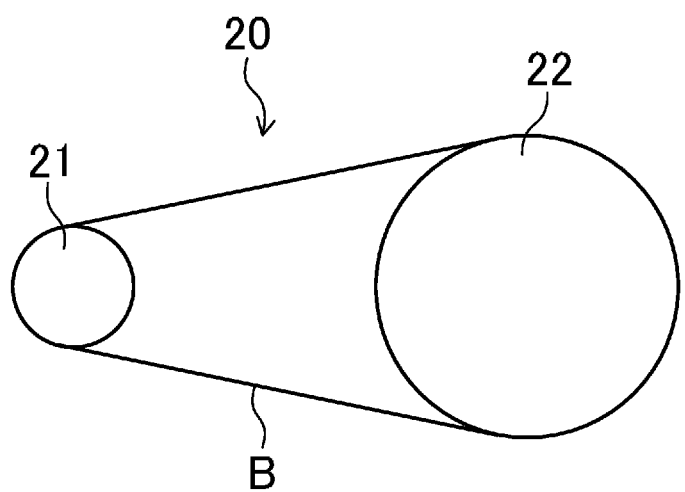
FIG. 2 illustrates the pulley layout of a belt running tester.

FIG. 2 illustrates the pulley layout of a belt running tester 20.

The belt running tester 20 includes a drive pulley 21 and a driven pulley 22 which are separated from each other in the horizontal direction. The drive pulley 21 has a diameter of 75 mm and has a V-groove around its circumference. The driven pulley 22 has a diameter of 210 mm and has a V-groove around its circumference.

Each of the double cogged V-belts B of Examples 1 to 5 and Comparative Examples 1 and 2 was wound around the drive pulley 21 and the driven pulley 22 so as to fit in their V-grooves. With the drive pulley 21 being rotated at 6000 rpm at an ambient temperature of 80° C., rotational torque load was applied to the driven pulley 22 so that input torque to the drive pulley 21 became 70 N·m. The belt was kept running until it broke. Running time from the time the belt started running until it broke was measured as high load durability life. The belt temperature during running of the belt was also measured using a non-contact thermometer, and a maximum belt temperature was recorded.

(Test Results)

The test results are shown in Table 2. Table 2 shows that Examples 1 to 5 have better high load durability than Comparative Examples 1 and 2 and that Examples 1 to 5 have lower belt temperatures during running of the belt than Comparative Examples 1 and 2.

TABLE 2

|  | Examples | | | | | Comparative Examples | |
| --- | --- | --- | --- | --- | --- | --- | --- |
|  | 1 | 2 | 3 | 4 | 5 | 1 | 2 |
| High Load Durability Life, Hours | 108 | 137 | 155 | 102 | 78 | 46 | 49 |
| Maximum Belt Temperature, ° C. | 136 | 131 | 128 | 137 | 141 | 160 | 154 |

INDUSTRIAL APPLICABILITY

The invention is applicable to raw edge V-belts.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A raw edge V-belt, comprising:
   a compression rubber layer formed on an inner side of the belt and made of a rubber composition, wherein
      the rubber composition contains a rubber component, fine cellulose fibers, para-aramid short fibers, and carbon black,
      a content of the para-aramid short fibers in the rubber composition is 27 parts by mass or more and 40 parts by mass or less per 100 parts by mass of the rubber component, and a volume fraction of the para-aramid short fibers in the rubber composition is 12.5 vol % or more, and
      a sum of the content of the carbon black and the content of the para-aramid short fibers in the rubber composition is 68 parts by mass or more and 77 parts by mass or less per 100 parts by mass of the rubber component.

2. The raw edge V-belt of claim 1, wherein the rubber component includes chloroprene rubber.

3. The raw edge V-belt of claim 1, wherein the fine cellulose fibers include fine cellulose fibers produced by a mechanical process.

4. The raw edge V-belt of claim 1, wherein a content of the fine cellulose fibers in the rubber composition is 1 part by mass or more and 20 parts by mass or less per 100 parts by mass of the rubber component.

5. The raw edge V-belt of claim 1, wherein the para-aramid short fibers include copolyparaphenylene-3,4'-oxydiphenylene terephthalamide short fibers.

6. The raw edge V-belt of claim 1, wherein the content of the para-aramid short fibers in the rubber composition is higher than the content of the fine cellulose fibers in the rubber composition.

7. The raw edge V-belt of claim 6, wherein a ratio of the content of the para-aramid short fibers to the content of the fine cellulose fibers in the rubber composition is 7.0 or more and 16.0 or less.

8. The raw edge V-belt of claim 1, wherein the carbon black includes FEF.

9. The raw edge V-belt of claim 1, wherein a content of the carbon black in the rubber composition is 30 parts by mass or more and 80 parts by mass or less per 100 parts by mass of the rubber component.

10. The raw edge V-belt of claim 1, wherein the content of the carbon black in the rubber composition is higher than the content of the fine cellulose fibers in the rubber composition.

11. The raw edge V-belt of claim 10, wherein a ratio of the content of the carbon black to the content of the fine cellulose fibers in the rubber composition is 5.0 or more and 19.0 or less.

12. The raw edge V-belt of claim 1, wherein a ratio of the content of the carbon black to the content of the para-aramid short fibers in the rubber composition is 0.30 or more and 2.8 or less.

13. The raw edge V-belt of claim 1, wherein the content of the carbon black in the rubber composition is the same as or higher than the content of the para-aramid short fibers in the rubber composition.

14. The raw edge V-belt of claim 1, wherein the carbon black has an arithmetic mean particle size of 50 μm or less.

* * * * *